United States Patent
Dimitrievski et al.

(10) Patent No.: US 6,250,081 B1
(45) Date of Patent: Jun. 26, 2001

(54) METHOD FOR PRODUCING CARBON/PLASTIC BRICKS FOR USE IN AN EVAPORATIVE CONTROL SYSTEM

(75) Inventors: Ljupco Dimitrievski, Macomb Township; Roger Khami, Troy, both of MI (US); John Thorn, Sylvania, OH (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/595,378

(22) Filed: Jun. 15, 2000

(51) Int. Cl.[7] .................................................. F01K 13/00
(52) U.S. Cl. .............................................. 60/645; 60/670
(58) Field of Search ........................... 60/643, 645, 670

(56) References Cited

U.S. PATENT DOCUMENTS

| | | | |
|---|---|---|---|
| 5,148,793 | * 9/1992 | Reddy | 123/520 |
| 5,149,347 | * 9/1992 | Turner et al. | 55/446 |
| 5,219,504 | * 6/1993 | Insley | 264/116 |
| 5,253,629 | * 10/1993 | Fornuto et al. | 123/519 |
| 6,143,058 | * 11/2000 | Dahlgren et al. | 96/13 |
| 6,146,446 | * 11/2000 | Tuma et al. | 95/90 |

* cited by examiner

Primary Examiner—Hoang Nguyen
(74) Attorney, Agent, or Firm—Mark L. Mollon

(57) ABSTRACT

A fuel vapor adsorption brick for use in a fuel vapor management system. The fuel adsorption brick is formed of a mixture of activated carbon and plastic compressed to a desired size and shape and placed within a portion of either the fuel tank or fuel tank attachments. The carbon/plastic brick is easy to make and provides great geometric flexibility for optimum vehicle packaging. The carbon/plastic brick may reduce or minimize the number of discrete parts used in a fuel tank assembly, as it can be integrated into either a fuel tank or fuel tank attachment, thereby eliminating the need for a separate carbon canister. The carbon/plastic brick minimizes or eliminates carbon dust associated adsorption/desorption cycles and also eliminates the need for apparatus to maintain carbon bed integrity.

22 Claims, 2 Drawing Sheets

METHOD FOR PRODUCING CARBON/PLASTIC BRICKS FOR USE IN AN EVAPORATIVE CONTROL SYSTEM

TECHNICAL FIELD

The present invention relates generally to evaporative control systems and more particularly to a method for producing carbon/plastic bricks for use in an evaporative control system.

BACKGROUND

Known types of on-board fuel vapor management systems comprise a vapor collection canister that collects and stores fuel vapor emitted from a tank containing volatile liquid fuel for the engine. A canister purge solenoid (CPS) valve periodically purges collected vapor to an intake manifold of the engine where it entrains with induction air or with an induction air-fuel charge for combustion in the engine combustion chamber space. One type of CPS valve comprises a solenoid that is under the control of a microprocessor-based engine management system. Because vapor storage systems such as carbon canisters have a finite capacity to adsorb fuel vapor, fuel vapor may be periodically emitted into the atmosphere when vapor storage systems exceed adsorption capacity.

One problem with the current designs of carbon canisters is that they require a complicated support structure to maintain the carbon bed integrity. Further, they require additional components, such as a dust/filter separator, vent valves, and vapor lines that incrementally add to the cost and complexity of the fuel vapor management systems.

It is thus desirable to provide a system that eliminates the need for carbon canisters and its related components while preventing the exposure of hydrocarbons to the atmosphere.

SUMMARY OF THE INVENTION

It is thus one object to eliminate the use of carbon canisters and its related components from the fuel evaporative control system.

The above object is accomplished by integrating the adsorbing activated carbon into either the fuel tank or various fuel tank attachments. To accomplish this, the activated carbon is first mixed with a plastic beads, heated, and formed under pressure into a carbon brick that is integrated into the fuel tank and/or the various fuel tank attachments.

The present invention offers many advantages over the carbon canister technology. First, the carbon brick can be shaped into any desired geometry to custom fit a particular cavity on the fuel tank or fuel tank attachments. Second, the carbon canister and its associated attachments are unnecessary, resulting in cost reductions related to manufacturing and assembly of the additional parts. Third, the addition of plastic to the activated carbon reduces carbon dust, which eliminates the need for dust filtering devices. Fourth, the new carbon brick invention has low flow restriction within the fuel tank.

Other objects and advantages of the present invention will become apparent upon considering the following detailed description and appended claims, and upon reference to the accompanying drawings.

DESCRIPTION OF THE PREFERRED EMBODIMENT(S)

Figure 1:
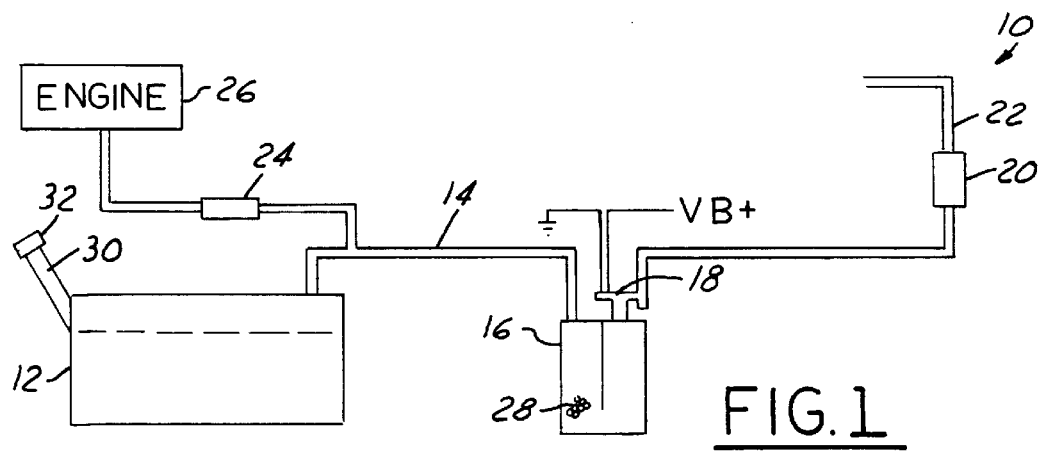
FIG. 1 is a perspective view of a fuel vapor storage system according to the prior art.

Referring now to FIG. 1, a fuel vapor storage system 10 is shown having as its major components a fuel tank 12, a fuel vapor line 14, a fuel vapor storage canister 16, a canister vent valve 18, a dust/filter separator 20, a fresh air vent line 22, and a vapor management valve 24.

Fuel vapor generation is a function of many factors. For instance, as the temperature increases in the fuel tank 12, more fuel vapor is generated. Also, as fuel levels within the fuel tank 12 decrease, or when fuel is sloshing within the fuel tank 12, excess fuel vapor is generated. Perhaps the greatest source of fuel vapor generation occurs when fuel is added to the fuel tank 12 through the gas line 30 when the gas cap 32 is removed.

When an internal combustion engine 26 is not running, fuel vapor generated within the fuel tank 12 travels through the fuel vapor line 14 into the fuel vapor storage canister 16. The fuel vapor storage canister 16 contains an active material (preferably carbon pellets 28 or granules) for adsorbing fuel vapor. The capacity of fuel vapor adsorption by the carbon pellets 28 is a function of the composition and surface area of the carbon pellets 28 within the canister 16. If the amount of fuel vapor exceeds the capacity of fuel vapor adsorption capability of the carbon pellets 22, excess fuel vapor is vented through the canister vent valve 18, the dust/filter separator 20, and out the fresh air vent line 22. When the engine 26 is not running, the vapor management valve 24 is closed, thus preventing fuel vapor from entering the engine 26 from the fuel vapor line 14 and preventing fuel vapor not combusted in the engine 26 from reentering the fuel line 14.

When the engine 26 is running, the vapor management valve 24 is opened. An intake manifold vacuum acts on the fuel vapor storage system 10. This vacuum causes fresh air to flow into the fresh air vent line 22, through the dust/filter separator 20 and canister vent valve 18, and into the canister 16. The fresh air picks up the stored fuel vapors (the fuel vapor is deadsorbed by the carbon pellets 28) in the canister 16 and carries them through a fuel vapor line 14. The vapors pass through the open vapor management valve 24 and enter the intake manifold (not shown) of the engine 26 and into the combustion chambers for burning.

Figure 2:
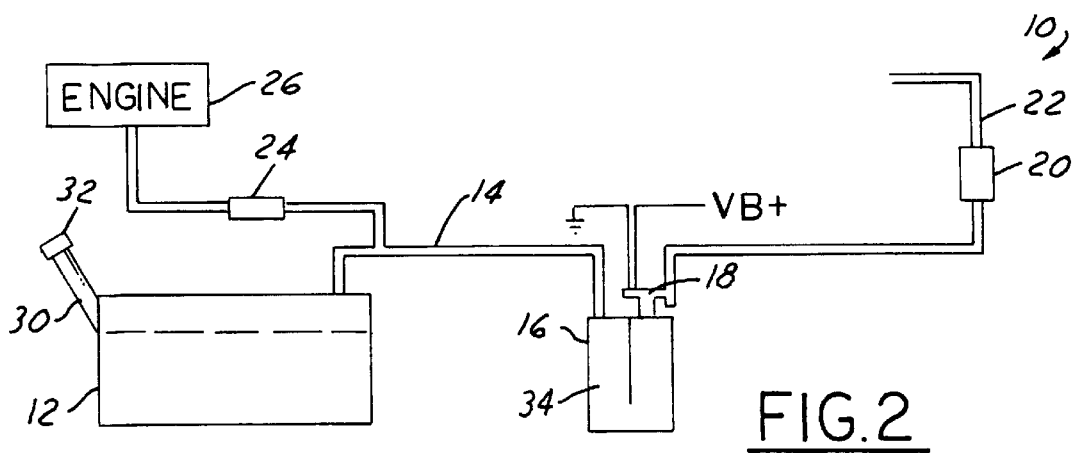
FIG. 2 is a perspective view of one preferred embodiment of the present invention containing carbon/plastic bricks.

Referring now to FIG. 2, a preferred embodiment of the present invention is depicted wherein a new carbon/plastic brick 34 replaces the carbon pellets 28 within the canister 16. The process for making the brick 34 is described below in FIG. 6. In this embodiment, the shape of the carbon/ plastic brick 34 substantially fills the inside portion of the canister 16. Thus, no spring plates (not shown), or other type of compacting mechanism, are necessary to ensure that the carbon pellets 28 are packed properly to prevent leakage or to ensure that the carbon bed integrity is maintained throughout the usable life of the canister 16.

Figure 3:
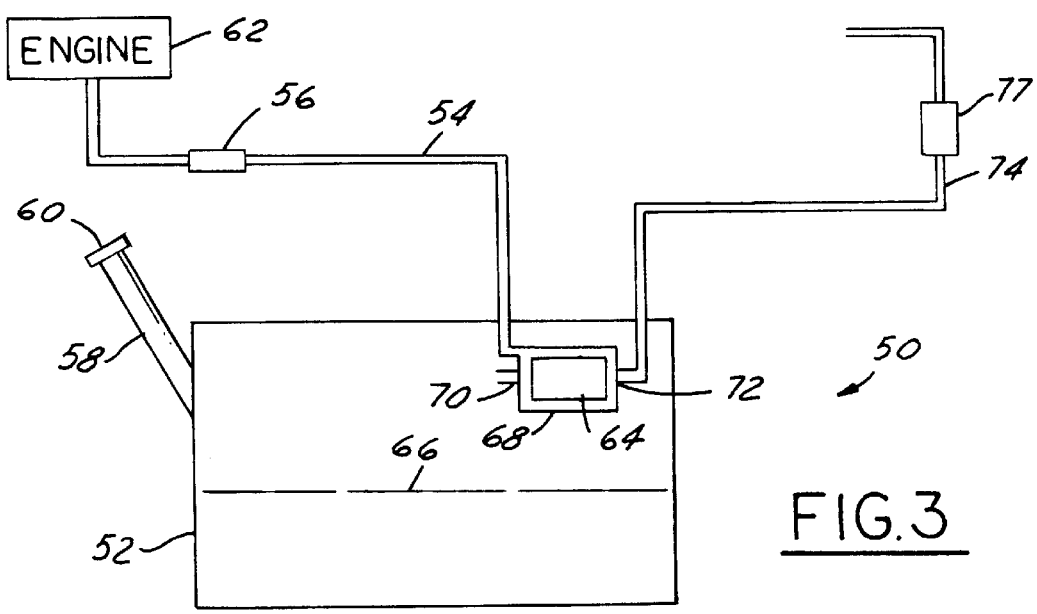
FIG. 3 is a perspective view of another preferred embodiment of the present invention in which the carbon/plastic brick is contained an impermeable housing within the fuel tank.
Figure 4:
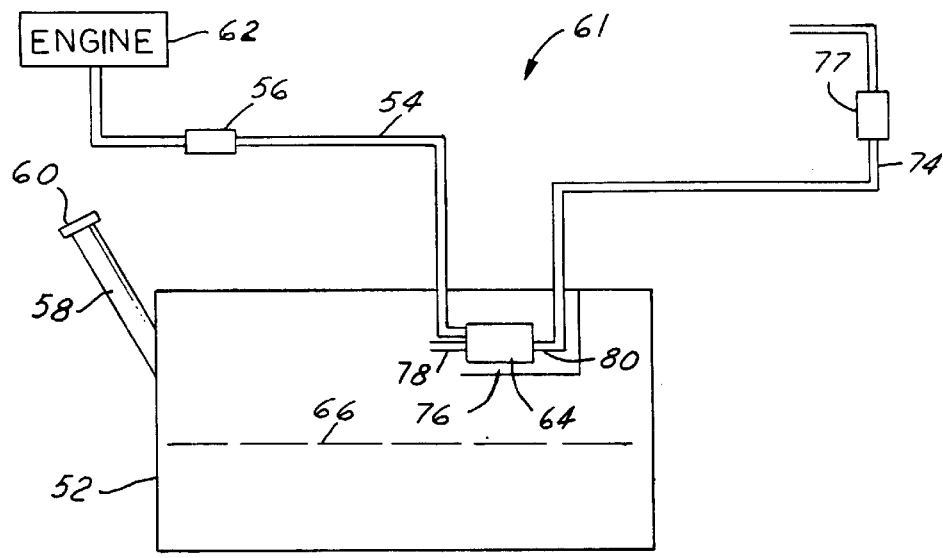
FIG. 4 is a perspective view of another preferred embodiment of the present invention in which the carbon/plastic brick is contained within a cavity region of the fuel tank.
Figure 5:
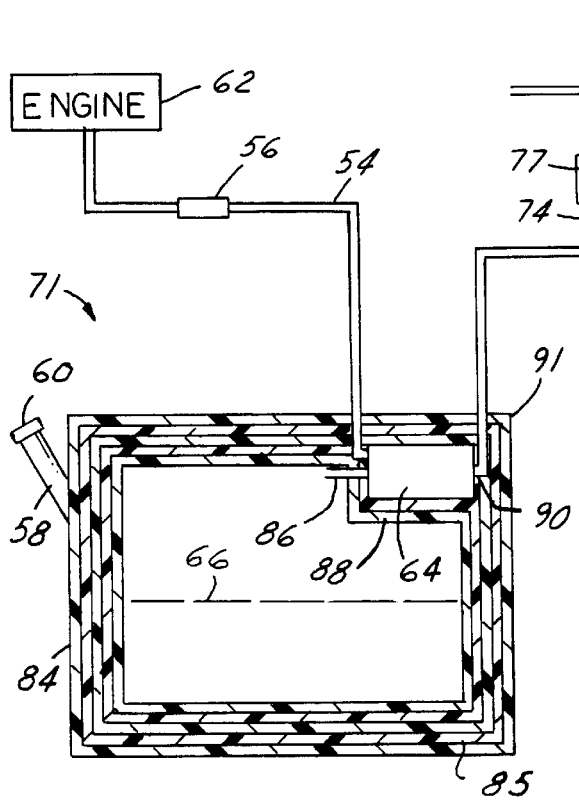
FIG. 5 is a perspective view of another preferred embodiment of the present invention in which the carbon/plastic brick is contained within a multilayer wall of a multilayer plastic fuel tank.

FIGS. 3, 4 and 5 depict three alternative preferred embodiments of the present invention in which the canister 16 is eliminated as a separate discrete part. The preferred embodiments in FIGS. 3 and 4 may be used with multilayer plastic fuel tanks or metal tanks, while FIG. 5 is specifically for use in multilayer plastic fuel tanks. In these embodiments, the carbon/plastic brick is placed within the fuel tank or fuel tank attachment. The process for making the carbon/plastic brick is described below in FIG. 6.

Referring now to FIG. 3, a fuel vapor storage system 50 according to another preferred embodiment of the present invention is depicted. The system 50 has a fuel tank 52, a fuel vapor line 54, a vapor management valve 56, a filler pipe 58, a fuel cap 60, and an internal combustion engine 62.

In this preferred embodiment, the carbon/plastic brick 64 is placed within an area of the fuel tank 62 that is not normally exposed to liquid fuel 66. The brick 64 is contained within an impermeable housing 68 composed of materials such as nylon or high-density polyethylene (HDPE). The housing 68 contains the inlet ports 70 to receive fuel vapor and the outlet port 72 coupled to the vent line 74. The inlet port 70 is positioned near the top portion of the fuel tank 52, where fuel vapor tends to accumulate. The housing 68 may be mounted or otherwise affixed to the tank 52 in ways that are well known in the art.

Alternatively, as shown in FIG. 4, the brick 64 is placed within a cavity 76 formed on the fuel tank 52 of the fuel vapor storage system 61, as opposed to within the impermeable housing 68 as in FIG. 3. The cavity 76 prevents exposure of the brick 64 to fuel 66 slosh. The brick 64 has inlet ports 78 to receive fuel vapor and an outlet port 80 coupled to the vent line 74. Again, the inlet port 78 is positioned in the top portion of the fuel tank 52. Further, the shape of the brick 64 is substantially similar to the shape of the cavity 76.

In another preferred embodiment, as shown in FIG. 5, specifically for use in the fuel vapor storage system 71 having a multilayer plastic fuel tanks 84, the carbon brick 64, without an impermeable housing, is integrated between the layers of the multilayer plastic tank 84 when the tank is blow molded. An inlet port 86 is formed at the top portion of the tank 84 through a portion 88 of the multilayer wall 85 of the tank 84 and into the brick 64. Further, an outlet port 90 is formed within another portion 91 of the multilayer wall 85 and is coupled to the vent line 72.

In FIGS. 3, 4 and 5, when the internal combustion engine 62 is not running, the vapor management valve 56 and fuel vapor generated within the fuel tank 52, 84 enters the brick 64 through an inlet port 70, 78, 86 and is adsorbed within the active material, here granulated or pelletized carbon, in the carbon/plastic brick 64. The capacity of fuel vapor adsorption the brick 64 is a function of the composition and surface area of the active material contained within the brick 64. Excess fuel vapor that cannot be adsorbed by the brick 64 enters the vent line 72 through the outlet port 72, 80, 90 and is vented to the atmosphere.

When the engine 62 is running, the vapor management valve 56 is opened. An intake manifold vacuum acts on the fuel vapor storage system 50, 61, 71. This vacuum causes fresh air to flow into the vent line 72, through the dust/filter separator 77 and into the carbon/plastic brick 64. The fresh air picks up the stored fuel vapors (the fuel vapor is deadsorbed by the activated carbon) in the brick 64 and carries them through a fuel vapor line 54. The vapors pass through the open vapor management valve 56 and enter the intake manifold (not shown) of the engine 62 and into the combustion chambers for burning.

While the preferred embodiment as depicted in FIGS. 3, 4 and 5 illustrate the carbon/plastic brick 64 contained within a portion of fuel tank 52, 84, it is specifically contemplated that the carbon/plastic brick may be contained in any of the various fuel tank attachments that are used in either metallic or plastic fuel tank assemblies. For example, the brick could be placed within a portion of a spill over valve or shut off tubes.

Figure 6:
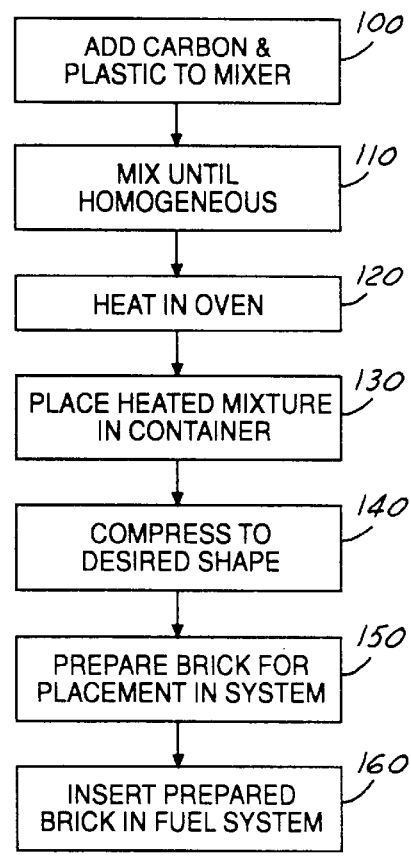
FIG. 6 is a logic flow diagram for preparing the carbon/plastic bricks according to the preferred embodiments of the present invention.

Referring now to FIG. 6, a logic flow diagram for creating the carbon/plastic bricks 34, 64 used in the preferred embodiments is illustrated. First, in Step 100, carbon pellets and plastic beads are placed in a mixing apparatus. Preferably, the mixture is approximately 70–97% by weight carbon (pelletized or granulated). Further, the plastic beads preferably have a melting point of at least 80 degrees Celsius, are able to adsorb small amounts of hydrocarbon vapor, are non-abrasive, have the ability to bind to themselves, and do not interfere with the adsorption/deadsorption mechanism of the carbon pellets. In application, this could include a wide variety of polyesters, fluoropolymers, or other various polyolefins.

In Step 110, tumbling or some other acceptable method mixes the carbon and plastic beads until they are substantially homogeneous. The homogeneous mixture is then placed in an oven at 80 degrees Celsius for 15–45 minutes in Step 120. Alternatively, the homogeneous mixture could be microwave heated or heated by some other acceptable method for a predetermined time at a predetermined frequency. At this point, the homogeneous mixture turns into a slurry and the plastic beads bind the carbon pellets together.

In Step 130, the homogeneous slurry is taken out of the oven and placed into a container. The mixture is then compressed to a desired shape under pressure in Step 140. Preferably, this compression is between 20 and 60 psi. Next, in Step 150, the shaped carbon brick 34, 64 is prepared for placement in the fuel system 50. Depending on the bricks ultimate destination, it can wrapped in a semi-impermeable membrane, faced or molded onto a seal, or simply be left as is. The brick 34, 64 is then inserted or welded into the fuel tank 62, 84 or fuel tank attachments or other acceptable container in Step 160.

The present invention offers many advantages over the prior art. First, the present invention has great geometric flexibility for optimum vehicle packaging. The size and shape of the bricks 34, 64 may be modified to accommodate a wide variety of sizes and shapes of fuel tanks or fuel tank attachments. This allows the bricks 34, 64 to be placed in fuel tanks or attachments without undo design changes.

Second, the present invention may reduce or minimize the amount of discrete parts in a fuel tank assembly. For instance, carbon canisters may eliminated. Further, depending upon the system, mounting brackets may also be eliminated. This may result in cost savings to the manufacturer by reducing the number of assembly processes required.

Third, because plastic is mixed into the activated carbon, carbon dust associated with higher flow rates is minimized. The plastic acts as a binder system that helps eliminate the breakdown of carbon during adsorption/desorption cycles.

While the invention has been described in terms of preferred embodiments, it will be understood, of course, that the invention is not limited thereto since modifications may be made by those skilled in the art, particularly in light of the foregoing teachings.

What is claimed is:

1. A fuel vapor management system comprising:

a fuel tank;

a fuel vapor line coupled to said fuel tank;

an internal combustion engine coupled to said fuel vapor line;

a vapor adsorption brick contained within the fuel vapor management system and coupled to said fuel vapor line, said vapor adsorption brick capable of adsorbing and deadsorbing fuel vapor, said vapor adsorption brick composed of activated carbon and plastic;

an inlet port coupled to said vapor adsorption brick;

an outlet port coupled to said vapor adsorption brick; and a vent line coupled to said outlet port.

2. The fuel vapor management system of claim 1, wherein said vapor adsorption brick is composed of between 3 and 30% by weight plastic.

3. The fuel vapor management system of claim 1, wherein said vapor adsorption brick is contained within said fuel tank.

4. The fuel vapor management system of claim 1, wherein said fuel tank having a cavity, wherein said vapor adsorption brick is substantially contained within said cavity.

5. The fuel vapor management system of claim 1 further comprising a fuel tank attachment coupled to said fuel tank, wherein said vapor adsorption brick is contained within said fuel attachment.

6. A fuel vapor adsorption brick for use in a fuel vapor-management system, the fuel vapor adsorption brick comprising:

a mixture of carbon and plastic heated and compressed to a desired size and shape; and an impermeable material surrounding a substantial portion of said mixture having an inlet port and an outlet port.

7. The fuel vapor adsorption brick of claim 6, wherein said mixture is between 3 and 30 percent by weight of said plastic.

8. The fuel vapor adsorption brick of claim 6, wherein said desired size and shape of the fuel vapor adsorption brick is a function of the shape of a top portion of a fuel tank in which the fuel vapor adsorption brick will be placed.

9. The fuel vapor adsorption brick of claim 6, wherein said desired size and shape of the fuel vapor adsorption brick is a function of the shape of a portion of a fuel tank attachment in which the fuel vapor adsorption brick will be placed.

10. The fuel vapor adsorption brick of claim 6, wherein said plastic is selected from the group consisting of polyester, polyolefin, and fluoropolymers.

11. A method for making fuel adsorption bricks for use in a fuel vapor management for use in a fuel vapor management system, the method comprising the steps of:

mixing a first amount of activated carbon with a second amount of plastic until homogeneous;

heating the homogeneous mixture at a first temperature for a predetermined amount;

compressing the heated homogeneous mixture to a desired size and shape; and substantially sealing the compressed homogeneous mixture within an impermeable material having an inlet port and an outlet port.

12. The method of claim 11, wherein the step of mixing a first amount of activated carbon with a second amount of plastic until homogeneous comprises the step of mixing a first amount of activated carbon with a second amount of plastic until homogeneous, wherein said second amount of said plastic is between 3 and 30% by weight of said mixture.

13. The method of claim 11, wherein the step of heating the homogeneous mixture at a first temperature for a predetermined period of time comprises the step of heating the homogeneous mixture at approximately 80 degrees Celsius for between 15 and 45 minutes.

14. The method of claim 11, wherein the step of heating the homogeneous mixture at a first temperature for a predetermined period of time comprises the step of microwave heating the homogeneous mixture for a predetermined amount of time at a predetermined frequency.

15. The method of claim 11, wherein the step of compressing the heated homogeneous mixture to a desired size and shape at a second pressure comprises the step of compressing the heated homogeneous mixture to a desired size and shape at between 20 and 60 psi of pressure.

16. The method of claim 11, wherein the step of substantially sealing the compressed homogeneous mixture within an impermeable material having an inlet port and an outlet port comprises the step of sealing the compressed homogeneous mixture within a nylon shell housing having an inlet port and an outlet port.

17. The method of claim 11, wherein the step of substantially sealing the compressed homogeneous mixture within an impermeable material having an inlet port and an outlet port comprises the step of sealing the compressed homogeneous mixture within a high density polyethylene shell housing having an inlet port and an outlet port.

18. The method of claim 11 further comprising the step of placing the substantially sealed compressed homogeneous mixture within a portion of the fuel vapor management system.

19. The method of claim 11 further comprising the step of placing the substantially sealed compressed homogeneous mixture within a portion of the fuel vapor management system.

20. The method of claim wherein the step of placing the substantially sealed compressed homogeneous mixture within a portion of the fuel vapor management system comprises the step of placing the substantially sealed compressed homogeneous mixture within a portion of a fuel tank of the fuel vapor management system.

21. The method of claim 18, wherein the step of placing the substantially sealed compressed homogeneous mixture within a portion of the fuel vapor management system comprises the step of placing the substantially sealed compressed homogeneous mixture within a portion of a fuel tank attachment of the fuel vapor management system.

22. The method of claim 19, wherein the step of placing the substantially sealed compressed homogeneous mixture within a portion of the fuel vapor management system comprises the step of placing the substantially sealed compressed homogeneous mixture within a portion of a fuel tank of the fuel vapor management system.

* * * * *